United States Patent Office.

WILLIAM H. LAWES, OF SOMERVILLE, NEW JERSEY.

*Letters Patent No. 62,644, dated March 5, 1867.*

IMPROVED LINIMENT FOR CURE OF FOOT-ROT IN SHEEP.

*The Schedule referred to in these Letters Patent and making part of the same.*

TO ALL WHOM IT MAY CONCERN:

Be it known that I, WILLIAM H. LAWES, of Somerville, in the county of Somerset, and State of New Jersey, have invented a new and useful Liniment for Curing Hoof Distemper; and I do hereby declare that the following is a full, clear, and exact description thereof.

At the present time great losses of sheep in different parts of the country occur, by reason of what is called "foot-rot," which is a distemper that gradually eats away the sheeps' feet near their hoofs and causes their death. The liniment which forms the subject of the present invention, by an external application, has been found to arrest the progress of the distemper and soon effect a cure.

The invention consists in a liniment or wash composed of the following ingredients, and in about the proportions as stated: nitric acid, two ounces; acetate of copper, one ounce; sulphate of copper, one ounce; nitrate of potash, one ounce. The acetate of copper, sulphate of copper, and nitrate of potash are pulverized and dissolved in the nitric acid, when the liniment will be ready for use.

The liniment is to be shaken when used, and applied as a wash to the infected parts. This liniment has been practically tested in many cases and found to effect a perfect cure.

What I claim as my invention, and desire to secure by Letters Patent, is—

A liniment made of the chemical ingredients herein specified, and in about the proportions specified.

WM. H. LAWES.

Witnesses:
CHAS. MORRILL,
S. C. MORRILL.